United States Patent
Lee et al.

(10) Patent No.: US 12,431,524 B2
(45) Date of Patent: Sep. 30, 2025

(54) LAMINATION APPARATUS AND METHOD FOR SECONDARY BATTERY

(71) Applicant: LG ENERGY SOLUTION, LTD., Seoul (KR)

(72) Inventors: Sang Myeon Lee, Daejeon (KR); Hyung Seok Han, Daejeon (KR); Ki Hoon Paeng, Daejeon (KR); Jae Won Moon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 888 days.

(21) Appl. No.: 17/424,096

(22) PCT Filed: Jan. 23, 2020

(86) PCT No.: PCT/KR2020/001227
§ 371 (c)(1),
(2) Date: Jul. 19, 2021

(87) PCT Pub. No.: WO2020/184835
PCT Pub. Date: Sep. 17, 2020

(65) Prior Publication Data
US 2022/0131175 A1 Apr. 28, 2022

(30) Foreign Application Priority Data
Mar. 12, 2019 (KR) .................. 10-2019-0028023

(51) Int. Cl.
*H01M 10/04* (2006.01)
*H01M 50/46* (2021.01)

(52) U.S. Cl.
CPC ... *H01M 10/0404* (2013.01); *H01M 10/0468* (2013.01); *H01M 50/46* (2021.01)

(58) Field of Classification Search
CPC ......... H01M 10/0404; H01M 10/0468; H01M 50/46
See application file for complete search history.

(56) References Cited

U.S. PATENT DOCUMENTS

| | | | |
|---|---|---|---|
| 2012/0132697 A1* | 5/2012 | Yano | B29C 65/7847 228/49.5 |
| 2013/0260211 A1 | 10/2013 | Min et al. | |

(Continued)

FOREIGN PATENT DOCUMENTS

| | | |
|---|---|---|
| CN | 104054205 A | 9/2014 |
| CN | 107667448 A | 2/2018 |

(Continued)

OTHER PUBLICATIONS

English Machine Translation for JP-2014075340-A (Year: 2014).*

(Continued)

*Primary Examiner* — Matthew T Martin
*Assistant Examiner* — Katherine N Higgins
(74) *Attorney, Agent, or Firm* — Birch, Stewart, Kolasch & Birch, LLP

(57) ABSTRACT

Discussed is a lamination apparatus for a secondary battery. The lamination apparatus for the secondary battery includes: an electrode transfer part configured to transfer at least one or more electrodes; a separator transfer part configured to transfer at least one or more separators; a combination part configured to combine and transfer the electrodes and the separators that are to be alternately disposed; and a position correction part configured to correct a position of an uppermost electrode disposed at an uppermost side among combined electrodes and the separators to align the position of the electrode with a set position of the separator among the combined electrodes and separators.

11 Claims, 10 Drawing Sheets

(56) References Cited

U.S. PATENT DOCUMENTS

| | | | | |
|---|---|---|---|---|
| 2014/0020239 A1* | 1/2014 | Yuhara | ................. | H01M 50/40 29/730 |
| 2014/0059875 A1 | 3/2014 | Yuhara et al. | | |
| 2014/0272507 A1 | 9/2014 | Ku et al. | | |
| 2015/0033547 A1* | 2/2015 | Yang | ................... | H01M 10/058 29/623.5 |
| 2018/0159165 A1* | 6/2018 | Cox | ................. | H01M 10/0413 |
| 2019/0215944 A1 | 7/2019 | Lee et al. | | |
| 2019/0237272 A1 | 8/2019 | Nishihara et al. | | |
| 2019/0252729 A1 | 8/2019 | Fujiwake et al. | | |
| 2019/0252730 A1* | 8/2019 | Fujiwake | ............... | H01M 4/043 |
| 2020/0235433 A1 | 7/2020 | Kim et al. | | |

FOREIGN PATENT DOCUMENTS

| | | | | |
|---|---|---|---|---|
| CN | 109301351 A | | 2/2019 | |
| CN | 109346774 A | | 2/2019 | |
| EP | 0 958 904 A1 | | 11/1999 | |
| JP | H1050300 | * | 2/1998 | |
| JP | 2003-249261 A | | 9/2003 | |
| JP | 2010-257861 A | | 11/2010 | |
| JP | 2014-75340 A | | 4/2014 | |
| JP | 2014075340 A | * | 4/2014 | |
| JP | 2016-162546 A | | 9/2016 | |
| JP | 2017-76489 A | | 4/2017 | |
| JP | 2018-8768 A | | 1/2018 | |
| JP | 2018-106978 A | | 7/2018 | |
| KR | 10-2012-0060700 A | | 6/2012 | |
| KR | 10-2012-0137143 A | | 12/2012 | |
| KR | 10-2013-0137229 A | | 12/2013 | |
| KR | 10-2015-0037089 A | | 4/2015 | |
| KR | 10-2017-0114351 A | | 10/2017 | |
| KR | 20170114351 | * | 10/2017 | |
| KR | 20170114351 A | * | 10/2017 | |
| KR | 10-2018-0082135 A | | 7/2018 | |
| KR | 20180082135 | * | 7/2018 | |
| KR | 20180082135 A | * | 7/2018 | |
| KR | 10-2018-0119946 A | | 11/2018 | |
| KR | 10-2019-0000589 A | | 1/2019 | |
| KR | 10-1937829 B1 | | 1/2019 | |
| WO | WO 2012/020480 A1 | | 2/2012 | |
| WO | WO 2012/081331 A1 | | 6/2012 | |
| WO | WO 2017/221900 A1 | | 12/2017 | |
| WO | WO 2018/116542 A1 | | 6/2018 | |
| WO | WO-2018116543 A1 | * | 6/2018 | ........... B65H 23/038 |

OTHER PUBLICATIONS

English Machine Translation for KR-20170114351-A (Year: 2017).*
English Machine Translation for KR-20180082135-A (Year: 2018).*
English Machine Translation for WO-2018116543-A1 (Year: 2018).*
English Machine Translation for (Year: 1998).*
Extended European Search Report for European Application No. 20769230.2, dated Feb. 14, 2022.
International Search Report for PCT/KR2020/001227 mailed on May 7, 2020.

* cited by examiner

LAMINATION APPARATUS AND METHOD FOR SECONDARY BATTERY

CROSS-REFERENCE TO RELATED APPLICATION

The present application claims the benefit of the priority of Korean Patent Application No. 10-2019-0028023, filed on Mar. 12, 2019, which is hereby incorporated by reference in its entirety.

TECHNICAL FIELD

The present invention relates to a lamination apparatus and method for a secondary battery, and more particularly, to a lamination apparatus and method for a secondary battery, which improve positional failure of the uppermost electrode disposed at the uppermost side thereof.

BACKGROUND ART

In general, secondary batteries refer to chargeable and dischargeable batteries, unlike primary batteries that are not chargeable. The secondary batteries are being widely used in the high-tech electronic fields such as mobile phones, notebook computers, and camcorders.

Such a secondary battery comprises an electrode assembly, in which electrodes and separators are alternately laminated, and a case accommodating the electrode assembly. Also, a method for manufacturing the secondary battery comprises a process of manufacturing electrodes, a lamination process of alternately stacking and bonding the electrodes and separators to manufacture an electrode assembly, a process of accommodating the electrode assembly into a case to manufacturing an unfinished secondary battery, and an activation process of charging and discharging the unfinished secondary battery to manufacture a finished secondary battery.

The lamination process comprises a step of transferring the electrodes and the separators, a step of combining the electrodes with the separators so as to be alternately disposed so that one electrode is disposed at the uppermost side, a heating step of heating the electrodes and the separators, which are combined with each other, and a bonding step of bonding the electrodes to the separators, which are heated, to manufacture a radical unit, wherein at least one or more radical units are provided to manufacture the electrode assembly.

In the heating step, the combined electrodes and separators are heated while being transferred. Here, there is a problem that the electrode disposed at the uppermost side among the combined electrodes and separators is twisted or changed in position by vibration occurring during the transfer.

That is, the lamination process has a problem in that a positional failure of the uppermost electrode occurs when the combined electrodes and separators are heated.

DISCLOSURE OF THE INVENTION

Technical Problem

The present invention has been invented to solve the above problems, and an object of the present invention is to provide a lamination apparatus and method for a secondary battery, which correct a position of the uppermost electrode when electrodes and separators, which are combined with each other, are heated while being transferred, to correct twisting and position failure of the uppermost electrode, thereby improving an alignment of the uppermost electrode.

Technical Solution

A lamination apparatus for a secondary battery according to an embodiment of the present invention for achieving the above object comprises: an electrode transfer part configured to transfer at least one or more electrodes; a separator transfer part configured to transfer at least one or more separators; a combination part configured to combine and transfer the electrodes and the separators to be alternately disposed downward from an upper side; and a position correction part configured to correct a position of the electrode among the electrodes and the separators, which are combined by the combination part, to align the position of the electrode with a set position of the separator.

The position correction part may correct a position of the uppermost electrode disposed at the uppermost side among the electrodes to align the position of the uppermost electrode with the set position of the separator, and the position correction part may comprise a pair of correction members, which are respectively provided on left and right sides of the uppermost electrode that is perpendicular to a transfer direction of the electrodes and the separators, which are combined by the combination part, to press left and right surfaces of the uppermost electrode, thereby aligning the position of the uppermost electrode with the set position of the separator.

The pair of correction members may comprise a belt of which a portion facing the electrodes rotates in the same direction as the transfer direction of the electrodes and the separators, which are alternately stacked, to press the left or right surface of the uppermost electrode in a state of surface-contacting the left or right surface of the uppermost electrode, thereby correcting a position and twisting of the electrode.

The belt may be made of a flexible material.

The pair of correction members may comprise a driving roller coupled to a front end of the belt into which the uppermost electrode is introduced and two or more driven rollers coupled to a rear end of the belt from which the electrodes 11 are withdrawn.

The front end of the belt to which the driving roller is coupled may be spaced larger than the rear end of the belt to which the driven roller is coupled when viewed based on the combined electrodes and separators.

The position correction part may further comprise a moving member that allows the pair of correction members to move toward the electrode so as to press the side surfaces of the uppermost electrode or allows each of the pair of correction members to return to its original position so as not to press the electrode.

The position correction part may further comprise: a measurement sensor configured to photograph the uppermost electrode disposed at the uppermost side among the combined electrodes and separators so as to calculate an electrode position value from a photographed image; and a control member configured to determine whether the position value of the electrode, which is calculated by the measurement sensor, is within a previously input set position value of the separator, wherein, when the control member determines that the electrode position value is within the set position value, the pair of correction members may move through the moving member to press a left or right surface of the uppermost electrode, thereby correcting the position of the uppermost electrode so that the position value of the uppermost electrode is defined within the set position value of the separator.

The belt may rotate at a speed corresponding to a transfer speed of the combined electrodes and separators.

The lamination apparatus may further comprise a heating part configured to heat the electrodes and the separators, which are combined by the combination part, wherein the position correction part may correct a position of the uppermost electrode disposed at the uppermost side among the electrodes and the separators, which pass through the heating part, to align the position of the uppermost electrode with the set position of the separator.

An elastic ring made of a flexible material may be further coupled to an outer circumferential surface of the driving roller or the driven roller.

A lamination method for a secondary battery according to the present invention comprises: an electrode transfer step (S10) of transferring at least one or more electrodes; a separator transfer step (S20) of transferring at least one or more separators; a combination step (S30) of transferring the electrodes and the separators in a state in which the electrodes and the separators are combined to be alternately disposed downward from an upper side; a heating step (S40) of heating the electrodes and the separators, which are transferred in the combination step (S30); and a position correction step (S50) of correcting a position of the electrode among the electrodes and the separators, which are heated in the heating step (S40), to align the position of the electrode with a set position of the separator.

In the position correction step, the position of the uppermost electrode disposed at the uppermost side among the electrodes may be corrected to be aligned with the set position of the separator, and the position correction step (S50) may comprise: a calculation process (S51) of calculating a position value of the uppermost electrode disposed at the uppermost side among the combined electrodes and separators; an inspection process (S52) of determining whether the electrode position value calculated in the calculation process (S51) is within a previously input set position value of the separator; and a correction process (S53) of correcting the position of the uppermost electrode when the electrode position value is out of the set position value so that the position value of the uppermost electrode is defined within the set position value.

In the calculation process (S51), the uppermost electrode disposed at the uppermost side among the combined electrodes and separators may be photographed through a measurement sensor provided in the position correction part to calculate an electrode position value from an image of the photographed electrode, and in the inspection process (S52), whether the electrode position value calculated in the calculation process (S51) is within the previously input set position value of the separator may be determined through a control member provided in the position correction part.

In the correction process (S53), when the electrode position value is out of the set position value, a pair of correction members may move toward the electrode through a moving member provided in the position correction part to press a left or right surface of the uppermost electrode through the pair of correction members, thereby correcting the position of the uppermost electrode so that the position value of the uppermost electrode is defined within the set position value.

Advantageous Effects

The lamination apparatus for the secondary battery according to the present invention may comprise the position correction part that corrects the position of the uppermost electrode disposed at the uppermost side among the electrodes and the separators, which are alternately disposed downward. Therefore, the twisting and the positional failure of the uppermost electrode may be improved to improve the alignment of the uppermost electrode.

In addition, in the lamination apparatus for the secondary battery according to the present invention, the position correction part may comprise the pair of correction members that respectively press the left and right sides of the uppermost electrode. As a result, the left or right side of the electrode disposed at the uppermost side may be pressed, or the left and right sides of the uppermost electrode may be pressed at the same time. Thus, the position of the uppermost electrode may be more stably corrected to improve the alignment of the uppermost electrode.

In addition, in the lamination apparatus for the secondary battery according to the present invention, the position correction part may press the left and right sides of the electrode through the belt. Particularly, the belt may rotate in the direction corresponding to the uppermost electrode. As a result, the deviation in moving speed between the uppermost electrode and the separator may be prevented from occurring to improve the alignment between the uppermost electrode, the rest electrodes, and the separators.

Also, the lamination apparatus for the secondary battery according to the present invention may further comprise the heating part that heats the electrodes and the separators, which are stacked downward from the upper side. The position correction part may correct the position of the uppermost electrode among the electrodes and the separators, which pass through the heating part. As a result, the position of the uppermost electrode may be effectively corrected even if the separator is shrunk by the heating part to cause the twisting or positional failure of the uppermost electrode, thereby improving the alignment of the uppermost electrode.

BRIEF DESCRIPTION OF THE DRAWINGS

FIGS. 6 and 7 are views illustrating an operation state of the position correction part of the lamination apparatus for the secondary battery according to the first embodiment of the present invention, wherein FIG. 6 is a view illustrating a state of detecting a position of the uppermost twisted electrode, and FIG. 7 is a view illustrating a state of correcting the position of the uppermost twisted electrode.

MODE FOR CARRYING OUT THE INVENTION

Figure 1:
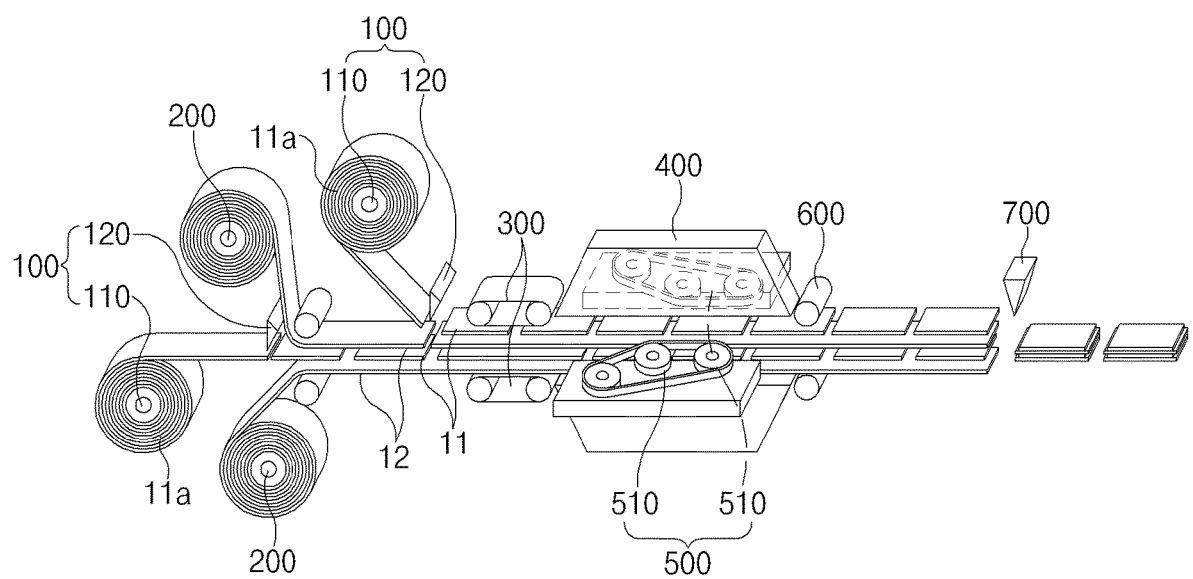
FIG. 1 is a process view illustrating a lamination apparatus for a secondary battery according to a first embodiment of the present invention.
Figure 2:
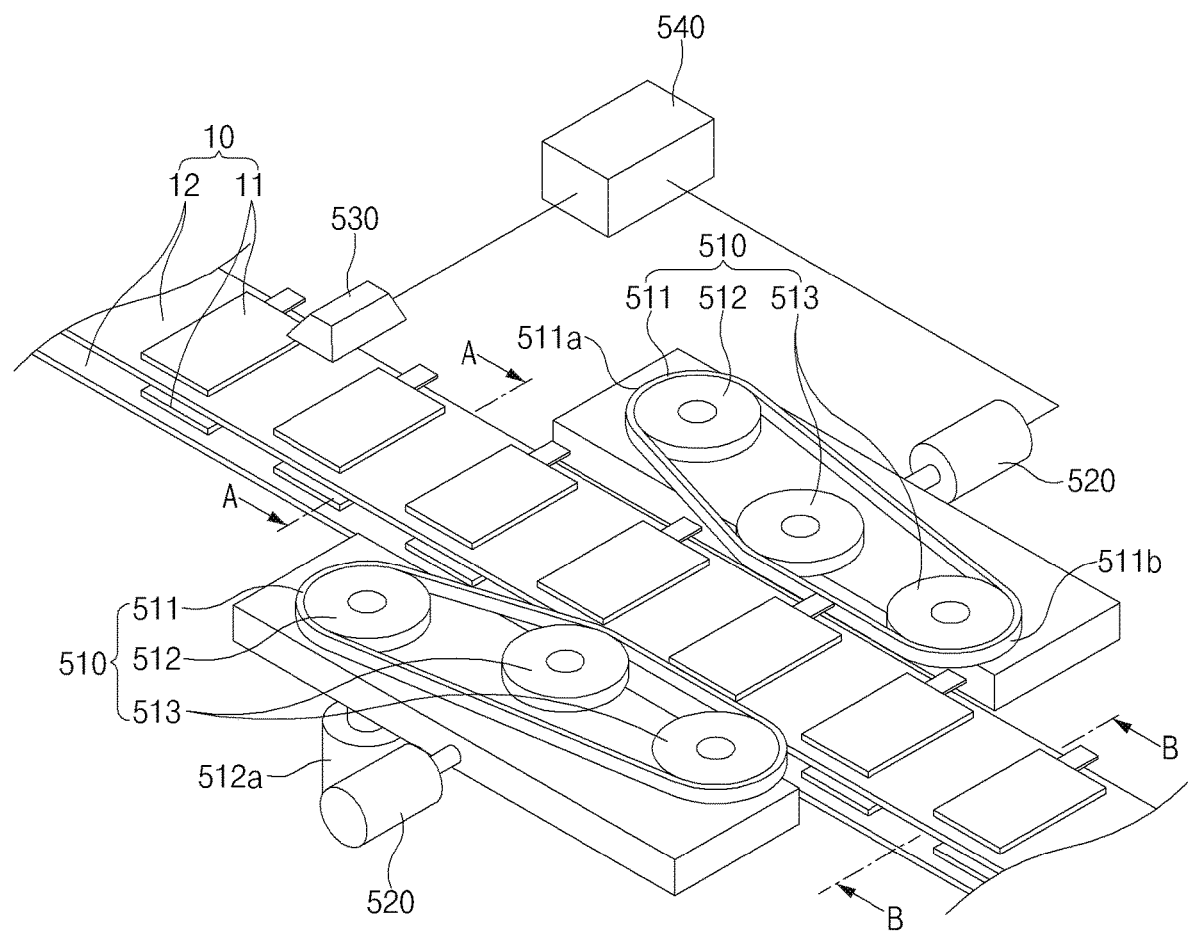
FIG. 2 is a perspective view illustrating a position correction part of the lamination apparatus for the secondary battery according to the first embodiment of the present invention.
Figure 3:
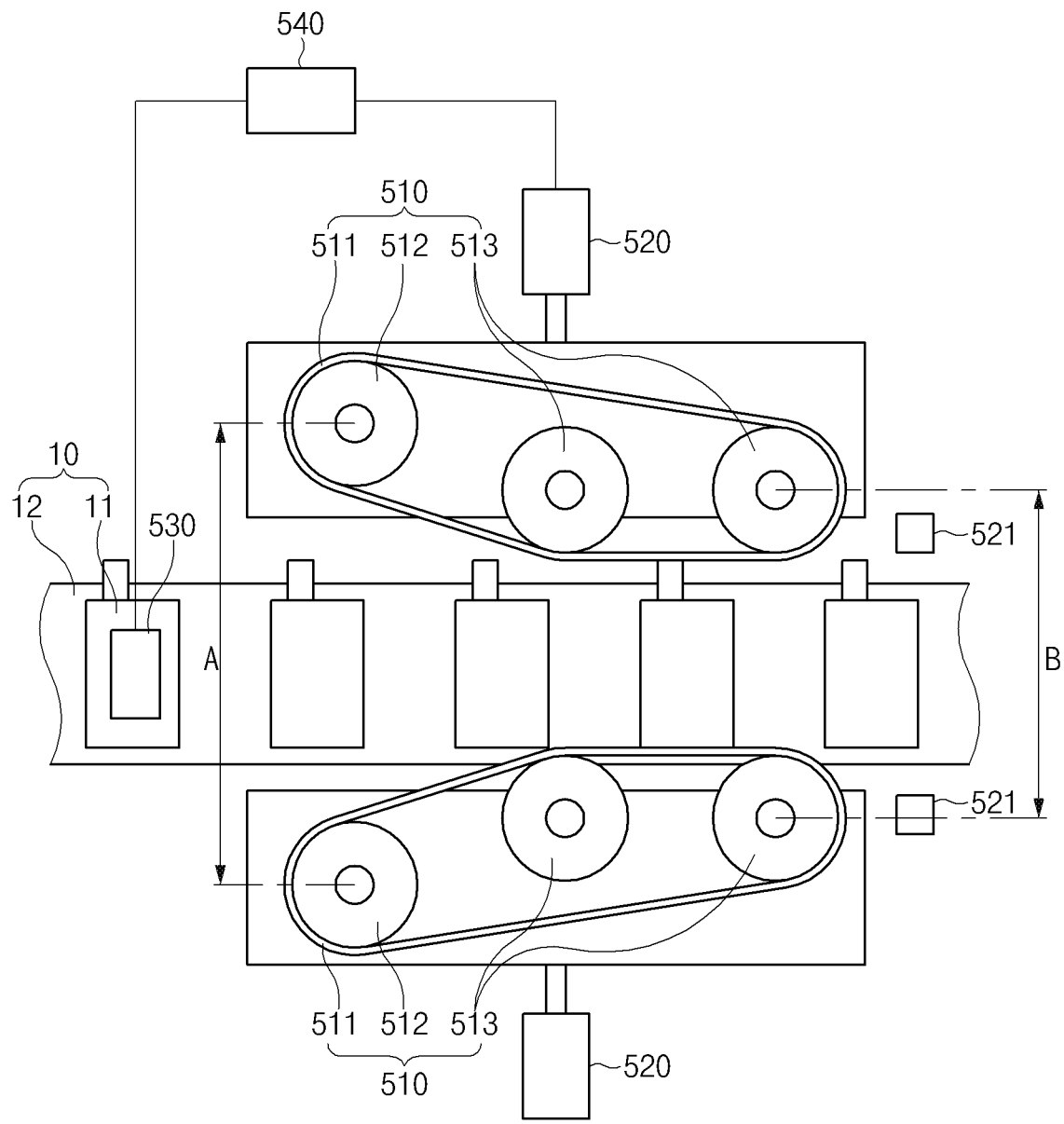
FIG. 3 is a plan view of FIG. 2.
Figure 4:
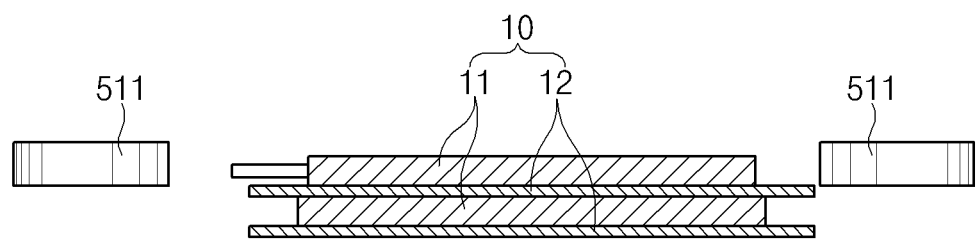
FIG. 4 is a cross-sectional view taken along line A-A of FIG. 2.
Figure 5:
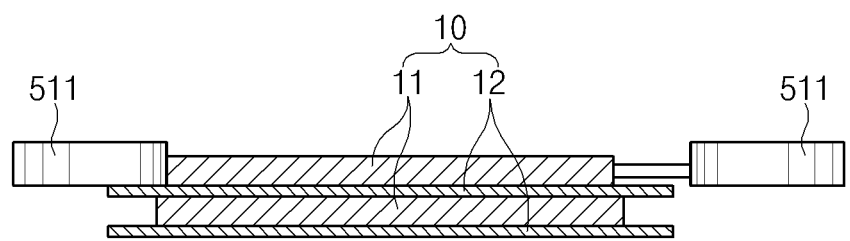
FIG. 5 is a cross-sectional view taken along line B-B of FIG. 3.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[Lamination Apparatus for Secondary Battery According to First Embodiment of the Present Invention]

As illustrated in FIG. 1, a lamination apparatus for a secondary battery according to a first embodiment of the present invention comprises an electrode transfer part (or an electrode transferor) 100 which transfers at least one or more electrodes 11, a separator transfer part (or a separator transferor) 200 which transfers at least one or more separators, a combination part (or a combiner) 300 by which the electrodes 11 and the separators 12 are transferred in a state of being combined to be alternately disposed downward from an upper side, a heating part (or a heater) 400 heating the electrodes 11 and the separators 12, which are combined with each other by the combination part 300, a position correction part (or a position connector) 500 which corrects a position of the electrode 11 disposed at the uppermost side (hereinafter, referred to as the uppermost electrode) among the electrodes 11 and the separators 12, which are heated by the heating part 400, so as to be aligned at a set position of the separator 12, a rolling part (or a roller) 600 which rolls and bond the combined electrodes and separators 11 and 12, which pass through the heating part 400, and a cutting part (or a cutter) 700 which cuts the separator between the corresponding electrodes to manufacture a radial unit having a predetermined size.

Electrode Transfer Part

The electrode transfer part 100 is configured to transfer at least one or more electrodes. That is, the electrode transfer part 100 comprises an electrode transfer roller 110, which transfers at least one or more electrode sheets 11a, and a cutter 120, which cuts the at least one or more electrode sheets 11a transferred by the electrode transfer roller 110 into a predetermined size to manufacture the electrodes 11.

The electrode transfer part 100 having the above-described configuration may continuously produce the electrodes 11 and transfer the continuously produced electrodes 11 to be disposed on an upper portion of the separator transferred by the separator transfer part.

Separator Transfer Part

The separator transfer part 200 is configured to transfer at least one or more separators. That is, the separator transfer part 200 comprises one or more separator transfer rollers, and the one or more separator transfer rollers transfer the separator wound on an outer circumferential surface thereof to the combination part.

Combination Part

The combination part 300 combine the electrodes and the separators to be alternately disposed. That is, the combination part 300 combines at least one or more electrodes transferred by the electrode transfer part 100 and at least one or more separators 12 transferred by the separator transfer part 200 so as to alternately disposed downward from the upper side. Here, the electrode 11 may be disposed at the uppermost side, and the combined electrodes and separators may be transferred to the rolling part via the heating part.

For example, referring to FIG. 1, the combination part 300 may combine two electrodes 11 transferred by the electrode transfer part 100 and two separators 12 transferred by the separator transfer part 200 so as to be alternately disposed and then transfer the combined electrodes and separators to the roller part via the heating part. That is, the combination part 300 transfers the electrodes and the separators in the state in which the electrode, the separator, and the electrode are combined to be disposed downward to the upper side.

Heating Part

The heating part 400 is configured to heat the combined electrodes and separators to improve bonding strength between the electrodes and the separators. That is, the heating part 400 may be provided on each of upper and lower portions of the combined electrodes and separators 11 and 12 to heat the combined electrodes and separators 11 and 12 by using high-temperature heat.

Here, the uppermost electrode 11 disposed at the uppermost side among the combined electrodes and separators may do not have fixed strength and thus be easily twisted or changed in position by external vibration or impact. Particularly, the heating part 400 may heat the combined electrodes and separators and simultaneously generate vibration during the transfer. Thus, the uppermost electrode may be twisted or changed in position by the vibration.

The present invention may comprise the position correction part 500, which corrects a position of the uppermost electrode 11 that is twisted or changed in position, thereby improving alignment of the uppermost electrode 11.

Hereinafter, the position correction part will be described in more detail.

Position Correction Part

As illustrated in FIGS. 2 to 5, the position correction part 500 is configured to correct the position of the uppermost electrode among the electrodes and the separators, which are combined by the combination part, to align the uppermost electrode with the set position of the separator. Also, the position correction part 500 may be configured to correct the position of the uppermost electrode 11 of the electrodes to align the uppermost electrode 11 with the set position of the separator.

That is, the position correction part 500 may comprise a pair of correction members 510, which are respectively provided on left and right sides of the uppermost electrode 11 that is perpendicular to a transfer direction of the electrodes 11 and the separators 12, which are combined by the combination part 300, to press left and right surfaces of the uppermost electrode 11, thereby aligning the position of the uppermost electrode 11 with the set position of the separator 12.

Figure 6:
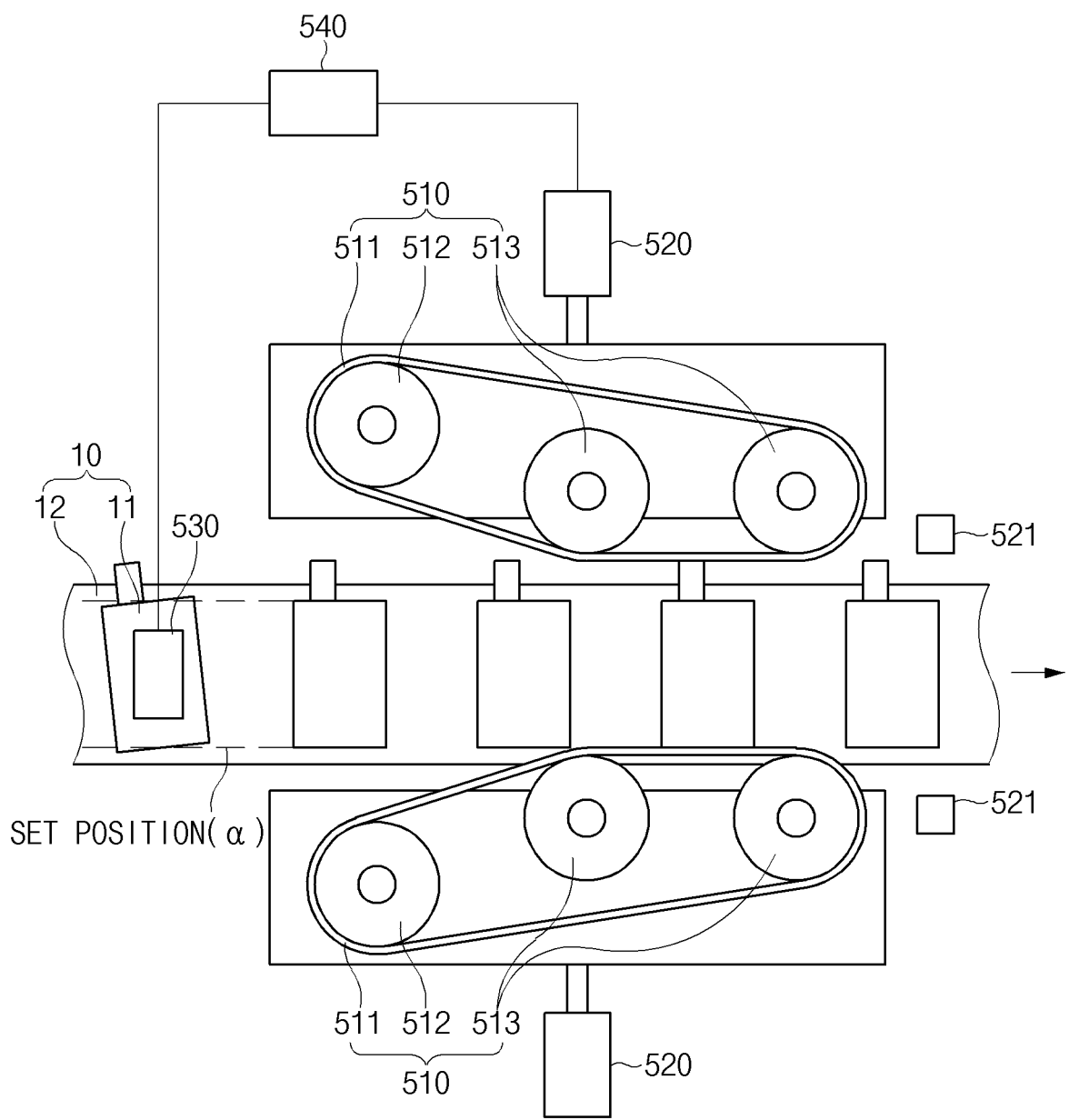

Referring to FIG. 6, the set position of the separator may be set on the uppermost separator 12 on which the uppermost electrode 11 is disposed and refer to a range within an indication line a, which is displayed parallel to the transfer direction of the separator 12, on both sides perpendicular to the transfer direction of the uppermost separator 12.

The pair of correction members 510 may press the left or right surface of the uppermost electrode 11 or press the left and right surfaces of the uppermost electrode 11 at the same time among the electrodes 11 and the separators 12, which are alternately disposed, to correct the twisting of the electrode 11, particularly, correct the position of the electrode, which is disposed out of the set position of the separator, so that the position value of the electrode is defined within the set position of the separator, thereby improving the alignment of the uppermost electrode 11.

Here, the pair of correction members 510 comprise a belt 511 of which a portion facing the electrodes 11 rotates in the same direction as the transfer direction of the electrodes 11 and the separators 12, which are alternately stacked, to press the left or right surface of the uppermost electrode 11 in a state of surface-contacting the left or right surface of the uppermost electrode 11. That is, the belt 511 may press the left or right surface of the uppermost electrode 11 in the state of surface-contacting the left or light surface of the uppermost electrode 11. Particularly, a portion of the belt 511 pressing the uppermost electrode 11 may be parallel to the transfer direction of the separator. Thus, the uppermost twisted electrode 11 may be changed in position in parallel to the transfer direction of the separator to improve the alignment of the uppermost electrode 11.

The belt 511 is made of a flexible material. Particularly, the belt 511 is made of silicone rubber. Thus, the belt 511 may elastically press the uppermost electrode 11 to prevent the uppermost electrode 11 from being folded or deformed by the belt 511.

According to another embodiment, the belt 511 may comprise a connection band made of a synthetic resin having rigidity and a buffer band provided on an outer circumferential surface of the connection band and made of a flexible material. Thus, the belt 511 may provide stable rotating force and prevent the uppermost electrode 11 from being deformed.

The belt 511 rotates at a speed corresponding to a transfer speed of the electrodes and the separators, which are transferred by the combination part 300. That is, the electrodes and the separators, which accord with the belt 511, may have the same speed. Thus, the belt 511 may prevent the uppermost electrode 11 from being decelerated or accelerated rather than the rest electrodes and the separators, thereby stably correcting the position of the uppermost electrode 11 by the belt 511.

Here, the belt 511 may be adjusted faster or slower than the transfer speed of the electrodes and the separators. That is, when a positional error of the uppermost electrode occurs in the transfer direction of the separator, the moving speed of the belt 511 that presses the uppermost electrode 11 may be controlled to be faster or slower than the transfer speed of the separators, thereby correcting positional failure of the uppermost electrode 11 with respect to the transfer direction of the separators.

The pair of correction members 510 comprise a driving roller 512 coupled to a front end of the belt 511 into which the uppermost electrode 11 among the combined electrodes and separators 11 and 12 is introduced to allow the belt 511 to rotate and two or more driven rollers 513 coupled to a rear end of the belt 511, from which the electrodes 11 are withdrawn, to support the belt 511 so that the belt 511 presses the uppermost electrode 11.

That is, the pair of correction members 510 may allow the belt 511 to stably rotate through the driving roller 512 connected to a motor 512a and allow the belt 511 rotating through the two or more driven rollers 513 to stably circulate. Particularly, the two or more driven rollers 513 are disposed parallel to the transfer direction of the combined electrodes and separators 11 and 12 to stably press the left or right surface of the uppermost electrode 11 through the belt 511, thereby aligning the uppermost electrode 11 in parallel to the transfer direction of the separator and also improving the alignment of the uppermost electrode 11.

Here, the front end of the belt 511 to which the driving roller 512 is coupled may be spaced larger than the rear end of the belt to which the driven roller 513 is coupled when viewed based on the combined electrodes and separators. That is, referring to FIG. 3, a distance A between the front ends 511a of the belts 511 provided in the pair of correction members 510 may be greater than a distance B between the rear ends 511b of the belts 511, and thus, the uppermost electrode 11 may be guided to be introduced between the pair of correction members 510.

The position correction part 500 further comprises a moving member 520 that allows the pair of correction members 510 to move toward the electrode 11 so as to press the side surfaces of the uppermost electrode 11 or allows each of the pair of correction members 510 to return to its original position so as not to press the electrode 11.

The moving member 520 is configured to allow the pair of correction members 510 to press the left or right surface of the electrode 11 and is provided as a cylinder. The cylinder comprises a cylinder body into/from which a pneumatic pressure is introduced or discharged and a piston rod, which is inserted into or withdrawn from the cylinder body by the pneumatic pressure that is introduced into and discharged from the cylinder body and which allows each of the pair of correction members 510 to move toward the electrode 11 or return to its original position. Here, the moving member 520 further comprises a detection sensor 521 which detects the pair of correction members 510 when the pair of correction members 510 is supported on the left or right surface of the uppermost electrode 11. The detection sensor 521 may transmit a signal to the moving member 520 to gradually accelerate the moving speed of each of the pair of correction members 510 when the pair of correction members 510 is supported on the left or right surface of the uppermost electrode 11, thereby inducing the pair of correction members 510 so as to gradually press the left or right surface of the electrode 11 and also significantly preventing the electrode 11 from being folded or deformed.

The position correction part 500 further comprises a measurement sensor 530 that calculates a position value of the uppermost electrode 11 among the combined electrodes and separators 11 and 12 and a control member 540 that determines whether the position value of the electrode, which is calculated by the measurement sensor 530, is within a previously input set position value of the separator so as to perform a control for the position correction.

The measurement sensor 530 photographs the uppermost electrode 11 among the combined electrodes and separators 11 and 12 to calculate an image value of the uppermost electrode from the photographed image, thereby calculating a position value of the electrode from the calculated image value.

Figure 7:
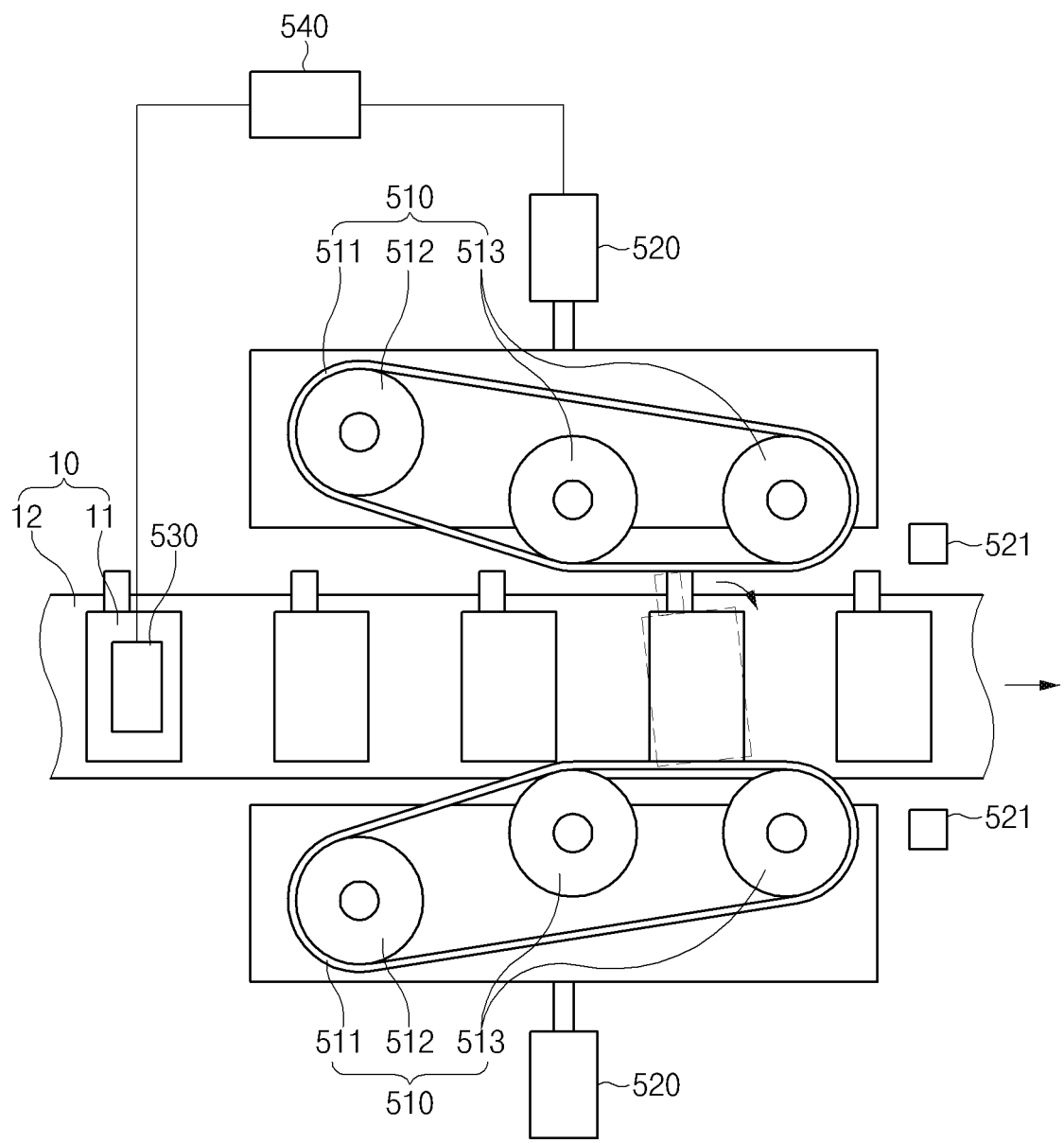

As illustrated in FIGS. 6 and 7, the control member determines whether the position value of the electrode, which is calculated by the measurement sensor 530, is within the previously input set position value of the separator. That is, the control member 540 determines the position value of the electrode as a normal value when the measured position value of the uppermost electrode 11 is within the set position value. Here, the uppermost electrode 11 that is determined as having the normal position value may pass as it is between the pair of correction members 510. As illustrated in FIG. 6, the control member 540 determines the position value of the electrode as an abnormal value when the measured position value of the uppermost electrode 11 is out of the set position value. If it is determined as being abnormal, the pair of correction members 510 move toward the uppermost electrode 11 through the moving member 520. Here, the control member 540 may allow only one correction member 510 to move through the moving member 520. Thus, as illustrated in FIG. 7, the left or right surface of the uppermost electrode 11 may be pressed, or the left and right surfaces of the uppermost electrode 11 may be pressed at the same time to correct the twisting or position of the uppermost electrode 11.

Rolling Part

The rolling part 600 may roll the combined electrodes and separators 11 and 12, which pass through the heating part 400, by using a pair of rolling rollers to improve bonding strength between the combined electrodes and separators 11 and 12.

Cutting Part

The cutting part 700 may cut the separator 12 between the corresponding electrodes 11 in the combined electrodes and separators 11 and 12 to manufacture a radical unit 10 having a predetermined size.

The lamination apparatus having the above-described configuration according to the first embodiment of the present invention may correct the twisting or positional error of the uppermost electrode 11 when the combined electrodes and separators are heated while being transferred to improve alignment of the uppermost electrode, thereby significantly reducing the product failure rate.

Hereinafter, a lamination method using the lamination apparatus for the secondary battery according to the first embodiment of the present invention will be described.

[Lamination Method for Secondary Battery According to First Embodiment of the Present Invention]

Figure 8A:
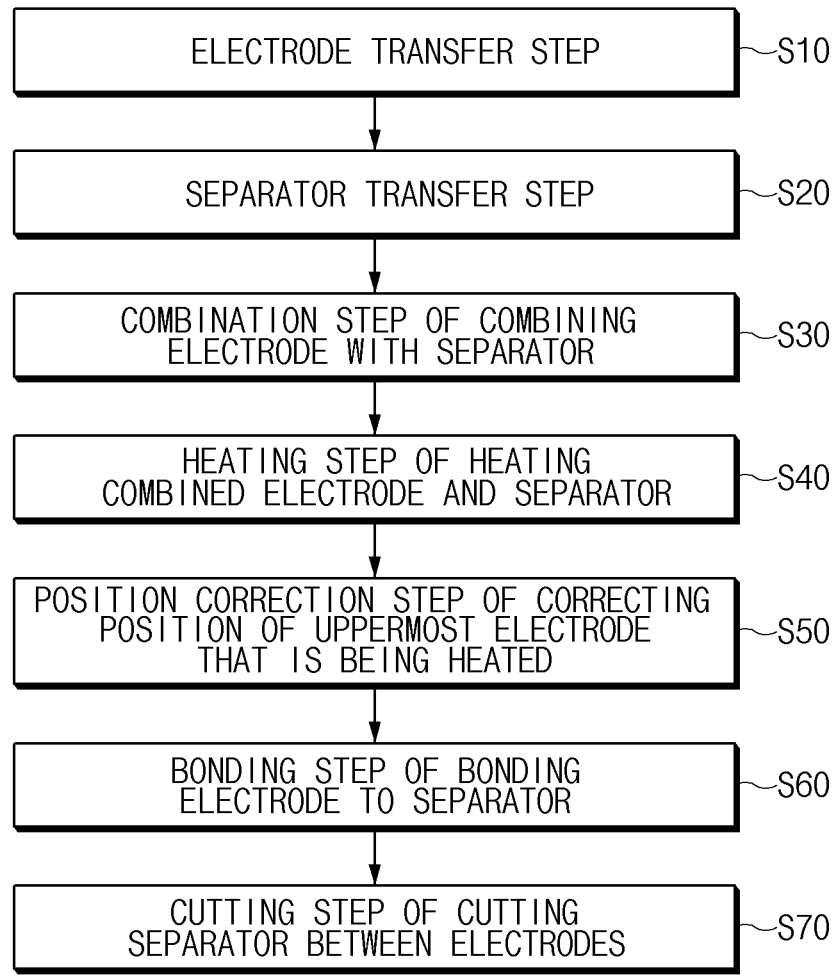
FIG. 8A is a flowchart of a lamination method for a secondary battery according to a first embodiment of the present invention.

As illustrated in FIG. 8A, a lamination method for a secondary battery according to the first embodiment of the present invention comprises an electrode transfer step or operation (S10) of transferring at least one or more electrodes 11, a separator transfer step or operation (S20) of transferring at least one or more separators 12, a combination step or operation (S30) of transferring the electrodes 11 and the separators 12 in a state in which the electrodes 11 and the separators 12 are combined to be alternately disposed downward from an upper side, a heating step or operation (S40) of heating the electrodes and the separators, which are transferred in the combination step (S30), and a position correction step or operation (S50) of correcting a position of the electrode 11 among the electrodes and the separators, which are heated in the heating step (S40), to align the position of the electrode with a set position of the separator.

Electrode Transfer Step

In the electrode transfer step (S10), the at least one or more electrodes 11 are transferred up to the combination part by using an electrode transfer part 100. That is, the electrode transfer part 100 transfers at least one or more electrode sheets through an electrode transfer roller 110 and cuts the electrode sheets transferred through the electrode transfer roller 110 into a predetermined size by using a cutter 120 to manufacture electrodes 11 and then transfers the manufactured electrodes 11 up to the combination part.

Separator Transfer Step

In the separator transfer step (S20), the at least one or more separators 12 are transferred up to the combination part by using a separator transfer part 200. That is, the separator transfer part 200 comprises one or more separator transfer rollers, and the one or more separator transfer rollers transfer the wound separator up to the combination part.

Combination Step

In the combination step (S30), the electrodes 11 transferred by the electrode transfer unit 100 and the separators 12 transferred by the separator transfer part 200 are combined to be alternately disposed in a vertical direction by using a combination part 300. Here, the electrode is combined to be disposed at the uppermost side.

For example, referring to FIG. 1, when two electrodes are transferred by the electrode transfer part 100, and two separators are transferred by the separator transfer part 200, the combination part 300 may combine the electrodes and the separators with each other to be disposed in order of the electrode, the separator, and the electrode.

Heating Step

The heating step (S40) is performed to heat the combined electrodes and separators to improve bonding strength between the electrodes and the separators. That is, in the heating step (S40), a heat source is irradiated toward the combined electrodes and separators 11 and 12 to be heated at a set temperature.

Here, when the combined electrodes and separators 11 and 12 are heated, a position of the uppermost electrode 11 is corrected in the position correction step (S50).

Position Correction Step

The position correction step (S50) may be a step of correcting the position of the electrode among the electrodes and the separators, which are heated in the heating step (S40), through the position correction part 500 to align the position of the electrode with the set position of the separator. Particularly, the position correction step S50 may be a step of correcting the position of the uppermost electrode 11 among the electrodes to align the position of the uppermost electrode 11 with the set position of the separator.

Figure 8B:
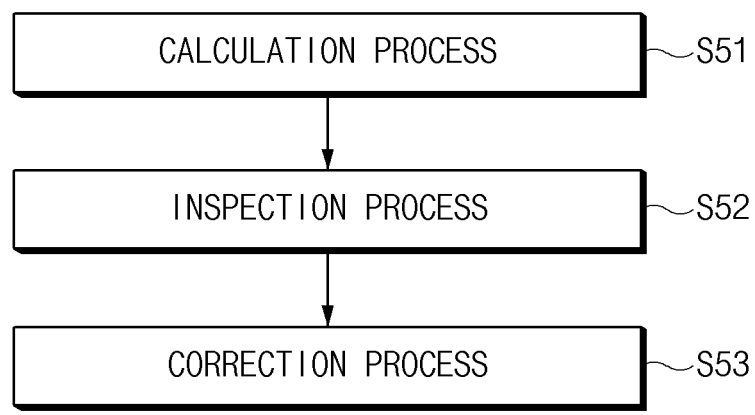
FIG. 8B is a flowchart of sub-processes of a position correction step of FIG. 8A.

As illustrated in FIG. 8B, the position correction step (S50) may comprise a calculation process (S51) of calculating a position value of the uppermost electrode 11 disposed at the uppermost side among the combined electrodes and separators 11 and 12, an inspection process (S52) of determining whether the electrode position value calculated in the calculation process (S51) is within a previously input set position value of the separator, and a correction process (S53) of correcting the position of the uppermost electrode when the electrode position value is out of the set position value so that the position value of the uppermost electrode 11 is defined within the set position value.

As illustrated in FIG. 6, in the calculation process (S51), the position of the uppermost electrode 11 passing through the set position among the combined electrodes and separators 11 and 12 is measured through the measurement sensor 530 to calculate a position value of the electrode from an image of the measured position of the uppermost electrode 11.

In the inspection process (S52), whether the electrode position value calculated in the calculation process (S51) is within the previously input set position value of the separator is determined through a control member 540. Here, when the electrode position value is within the previously input set position value of the separator, it is determined as being normal, and when the electrode position value is out of the previously input set position value, it is determined as being abnormal.

As illustrated in FIG. 7, in the correction process (S53), when the electrode position value is out of the set position value, the pair of correction members 510 move toward the uppermost electrode 11 through a moving member 520. Then, while the pair of correction members 510 move toward the uppermost electrode 11 through a moving member 520, the correction members 510 press a left or right surface of the uppermost electrode 11 in a state of surface-contacting the left or right surface of the uppermost electrode 11 to correct twisting or a position of the electrode 11 disposed between the pair of correction members 510.

The lamination method for the secondary battery according to the first embodiment of the present invention may further comprise a bonding step or operation (S60) of bonding the electrodes and the separators on which the heating step (S40) and the position correction step (S50) are performed and a cutting step or operation (S70) of cutting the bonded electrodes and separators to manufacture radial units.

Bonding Step

In the bonding step (S60), the electrodes and the separators on which the heating step (S40) and the position correction step (S50) are performed are rolled to be bonded to each other through a rolling part 600.

Cutting Step

In the cutting step (S70), the separator between the corresponding electrodes among the electrodes and the separators, on which the bonding step (S60) is performed, is cut by using a cutting part 700 to manufacture a radial unit that is a finished product and has a predetermined size.

Then, a plurality of radial units that are finished products may be stacked to manufacture an electrode assembly, and the electrode assembly may be accommodated in a pouch to manufacture the secondary battery according to the first embodiment.

Hereinafter, in descriptions of another embodiment of the present invention, constituents having the same function as the above-mentioned embodiment have been given the same reference numeral in the drawings, and thus duplicated description will be omitted.

[Lamination Apparatus for Secondary Battery According to Second Embodiment of the Present Invention]

Figure 9:
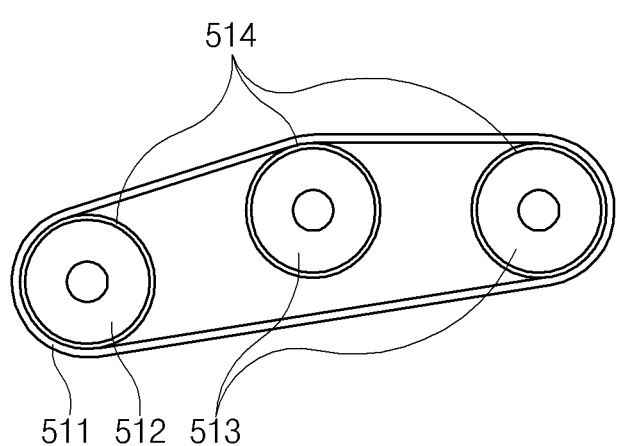
FIG. 9 is a plan of a lamination apparatus for a secondary battery according to a second embodiment of the present invention.

As illustrated in FIG. 9, a lamination apparatus for a secondary battery according to a second embodiment of the present invention comprises a position correction part 500 provided with a pair of correction members 510. The pair of correction members 510 comprise a driving roller 512 and a driven roller 513.

Here, an elastic ring 514 made of a flexible material may be further coupled to an outer circumferential surface of the driving roller 512 or the driven roller 513. The elastic ring 514 may elastically support a belt 511 coupled to the driving roller 512 or the driven roller 513 to significantly increase in elastic force of the belt 511 disposed on the driving roller 512 or the driven roller 513, thereby significantly preventing an uppermost electrode from being folded or deformed by the belt 511 disposed on the driving roller 512 or the driven roller 513.

Although the position correction part according to the present invention corrects the position of the uppermost electrode 11 in the above description, the present invention is not limited thereto. For example, the position correction part may correct a position of the electrode disposed at the other layer in addition to the uppermost layer.

Accordingly, the scope of the present invention is defined by the appended claims more than the foregoing description and the exemplary embodiments described therein. Various modifications made within the meaning of an equivalent of the claims of the invention and within the claims are to be regarded to be in the scope of the present invention.

The invention claimed is:

1. A lamination apparatus for a secondary battery, the lamination apparatus comprising:
    an electrode transfer part configured to transfer at least one or more electrodes;
    a separator transfer part configured to transfer at least one or more separators;
    a combination part configured to combine and transfer the electrodes and the separators that are to be alternately disposed; and
    a position correction part configured to correct a position of an electrode among combined electrodes and the separators to align the position of the electrode with a set position of a separator among the combined electrodes and separators,
    wherein the position correction part comprises a pair of correction members, which are respectively provided on opposite sides of the combined electrodes and separators,
    wherein the pair of correction members comprise a belt of which a portion facing the combined electrodes and separators rotates in the same direction as a transfer direction of the combined electrodes and separators, and
    wherein the pair of correction members further comprise:
    a driving roller coupled to a front end of the belt into which the combined electrodes and separators is introduced, the driving roller being configured to rotate the belt;
    two or more driven rollers coupled to a rear end of the belt from which the combined electrodes and separators is withdrawn, the two or more driven rollers being configured to be rotated by the belt,
    wherein the position correction part further comprises a moving member that allows the pair of correction members to move toward the electrode so as to press the left or right surface of the uppermost electrode or allows each of the pair of correction members to return to its original position so as not to press the electrode, and
    wherein the moving member moves the pair of correction members toward the electrode from opposite sides in a direction perpendicular to the transfer direction of the combined electrodes and separators.

2. The lamination apparatus of claim 1, wherein the position correction part corrects a position of an uppermost electrode disposed at an uppermost side among the electrodes to align the position of the uppermost electrode with the set position of the separator, and
    wherein the pair of correction members are respectively provided on opposite sides of the uppermost electrode that is arranged perpendicular to the transfer direction of the electrodes and the separators to press left and right surfaces of the uppermost electrode, and thereby aligning the position the uppermost electrode with the set position of the separator.

3. The lamination apparatus of claim 2, wherein a portion of the belt facing the electrodes rotates in the same direction as the transfer direction of the electrodes and the separators, which are alternately stacked, to press the left or right surface of the uppermost electrode in a state of surface-contacting the left or right surface of the uppermost electrode, and thereby correcting a position and twisting of the electrode.

4. The lamination apparatus of claim 3, wherein the belt is made of a flexible material.

5. The lamination apparatus of claim 1, wherein the front end of the belt to which the driving roller is coupled is spaced larger than the rear end of the belt to which the driven roller is coupled when viewed based on the combined electrodes and separators.

6. The lamination apparatus of claim 1, wherein the position correction part further comprises:
- a measurement sensor configured to photograph the uppermost electrode disposed at an uppermost side among the combined electrodes and separators so as to calculate an electrode position value from a photographed image; and
- a control member configured to determine whether the electrode position value of the electrode, which is calculated by the measurement sensor, is within a previously input set position value of the separator, wherein, when the control member determines that the electrode position value is within the set position value, the pair of correction members move through the moving member to press the left or right surface of the uppermost electrode, thereby correcting the position of the uppermost electrode so that a position value of the uppermost electrode is defined within the set position value of the separator.

7. The lamination apparatus of claim 3, wherein the belt rotates at a speed corresponding to a transfer speed of the combined electrodes and separators.

8. The lamination apparatus of claim 1, further comprising a heating part configured to heat the combined electrodes and the separators, which are combined by the combination part, wherein the position correction part corrects a position of an uppermost electrode disposed at an uppermost side among the electrodes and the separators, which pass through the heating part, to align the position of the uppermost electrode with the set position of the separator.

9. The lamination apparatus of claim 1, wherein an elastic ring made of a flexible material is further coupled to an outer circumferential surface of the driving roller or the driven roller.

10. The lamination apparatus of claim 1, wherein the combined electrodes and the separators are alternately disposed downward from an upper side thereof.

11. The lamination apparatus of claim 1, wherein the driving roller is connected to a motor, and the motor rotates the driving roller to rotate the belt.

* * * * *